(12) United States Patent
Mitrovic (10) Patent No.: US 7,144,349 B2
(45) Date of Patent: Dec. 5, 2006

(54) GAS TURBINE GEARBOX

(75) Inventor: Lazar Mitrovic, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 190 days.

(21) Appl. No.: 10/817,857

(22) Filed: Apr. 6, 2004

(65) Prior Publication Data

US 2005/0221946 A1 Oct. 6, 2005

(51) Int. Cl.
*F16H 57/02* (2006.01)
(52) U.S. Cl. ............... 475/331; 475/343; 74/665 F
(58) Field of Classification Search ........... 475/343, 475/331; 74/665 G, 665 GA, 665 F
See application file for complete search history.

(56) References Cited

U.S. PATENT DOCUMENTS

| | | | |
|---|---|---|---|
| 1,858,911 A | 5/1932 | Zerbi | |
| 1,992,333 A | 2/1935 | Stelzei | |
| 2,185,545 A | 1/1940 | Egan | |
| 2,192,469 A | 3/1940 | Green | |
| 2,228,638 A | 1/1941 | Mercier | |
| 2,297,214 A | 9/1942 | Gosslau | |
| 2,347,906 A | 5/1944 | Hatcher | |
| 2,359,045 A | 9/1944 | Markwalder | |
| 2,436,746 A * | 2/1948 | Drought | 74/325 |
| 2,442,838 A | 6/1948 | Butterfield | |
| 2,470,155 A | 5/1949 | Forsyth | |
| 2,480,806 A | 8/1949 | Desmoulins | |
| 2,498,767 A | 2/1950 | Phelan | |
| 2,522,443 A | 9/1950 | Gaubalz et al. | |
| 2,525,708 A | 10/1950 | Morris | |
| 2,543,453 A | 2/1951 | Fuller | |
| 2,700,311 A | 1/1955 | Bade | |
| 2,765,040 A | 10/1956 | Darrah | |
| 2,961,078 A | 11/1960 | Shannon et al. | |
| 3,153,907 A | 10/1964 | Griffith | |
| 3,335,979 A | 8/1967 | Kurkjian | |
| 3,646,834 A | 3/1972 | Davis | |
| 4,005,575 A | 2/1977 | Scott et al. | |
| 4,170,905 A | 10/1979 | Collin | |
| 4,242,920 A * | 1/1981 | Sigg | 74/361 |
| 4,242,925 A | 1/1981 | Farkas | |
| 4,452,102 A * | 6/1984 | Shaffer | 475/169 |
| 4,815,273 A | 3/1989 | Rudolph et al. | |
| 4,817,382 A | 4/1989 | Rudolph et al. | |
| 5,095,767 A * | 3/1992 | Spridco et al. | 74/397 |
| 5,186,609 A | 2/1993 | Inoue et al. | |
| 5,334,061 A | 8/1994 | Behm et al. | |
| 5,494,466 A | 2/1996 | Vernea | |
| 5,795,200 A | 8/1998 | Larkin | |
| 5,954,479 A | 9/1999 | Smith | |
| 6,148,605 A * | 11/2000 | Lardellier | 60/204 |
| 6,205,877 B1 * | 3/2001 | Vilain | 74/413 |
| 2006/0053965 A1 * | 3/2006 | Wittenstein et al. | 74/606 R |
| 2006/0130802 A1 * | 6/2006 | Laimboeck | 123/197.1 |

FOREIGN PATENT DOCUMENTS

JP 62270331 5/1989
JP 62335160 5/1989

* cited by examiner

*Primary Examiner*—Sherry Estremsky
(74) *Attorney, Agent, or Firm*—Ogilvy Renault LLP

(57) ABSTRACT

A gearbox for rotating a propeller in a selected one of a first and second direction is provided. The gearbox includes a many common components, selected irrespective of desired propeller direction, and a few unique components selected based on desired propeller direction.

14 Claims, 9 Drawing Sheets

GAS TURBINE GEARBOX

TECHNICAL FIELD

The present invention relates to gas turbine engines, and most particularly to gearboxes of such engines.

BACKGROUND OF THE INVENTION

In a typical turboprop engine, the propeller rotates in only one direction and the gearbox is designed to handle the associated reacted propeller loads accordingly, in addition to transmitting the driving power. However, because the gas turbine direction is generally fixed the propeller loads are somewhat asymmetric, and the gearbox design will vary depending on which direction the propeller is intended to rotate. Thus, if a gas turbine manufacturer wishes to provide a generic gas turbine engine capable or spinning a propeller in either direction depending on the customer's preference, two different gearbox designs must be available. Providing two gearboxes, however, increases the costs of production, inventory, etc. and, accordingly, there is a need for an improved gas turbine gearbox design adapted to drive a propeller either direction.

SUMMARY OF THE INVENTION

It is therefore an aim of the present invention to provide a generic gearbox design which minimizes duplication for different turboprop applications having differing directions of rotation.

Therefore, in accordance with the present invention, there is provided a gearbox for rotating a propeller of a gas turbine engine in a selected one of a first and second direction, the gearbox comprising a casing defining an enclosure, an output shaft rotating the propeller in the selected one of the first and second directions, the output shaft being partially enclosed in the casing, a mating gear driving the output shaft through a gear train, the mating gear having a first position within the casing, an input shaft receiving power from a turbine and rotating in the first direction, the input shaft being partially enclosed in the casing, an input pinion coupled to the input shaft, the input pinion having a second position within the casing, a plurality of accessory drive gears each adapted to drive one accessory, the plurality of accessory drive gears each having a third position within the casing, a multiple member gear rotating in the first direction, each member of the multiple member gear being meshed with at least one of the plurality of accessory drive gears, and the multiple member gear having a fourth position within the casing, and wherein an interaction exists between the input pinion, mating gear and multiple member gear, selected from the group consisting of a first and second configuration with the first, second, third and fourth positions being the same in the first and second configuration, the first configuration consisting of the input pinion being meshed with the mating gear such that the mating gear rotates in the second direction, and the multiple member gear being meshed with a first idler gear which is meshed with an accessory pinion coupled to the input pinion, the first idler gear and the accessory pinion being located within the casing, and the second configuration consisting of the input pinion being meshed with a second idler gear which is meshed with the mating gear such that the mating gear rotates in the first direction, the second idler gear being located within the casing, and the multiple member gear being coupled to the mating gear, wherein the selection between the first and second configurations determines the selected one of the first and second directions.

Also in accordance with the present invention, there is provided a method of manufacturing a gearbox for rotating a propeller of a gas turbine engine in a selected one of a first and second direction, the method comprising the steps of casting a casing, selecting one of a first and second configuration corresponding to the selected one of the first and second direction, machining the casing according to the selected one of the first and second configuration, partially inserting an input shaft and an output shaft within the casing, providing in the casing a gear train adapted to drive the output shaft, a mating gear meshed with the gear train, an input pinion coupled to the input shaft, a multiple member gear, and a plurality of accessory drive gears each adapted to drive one accessory, at least one accessory drive gear being meshed with each member of the multiple member gear, providing in the casing at least one element corresponding to the selected one of the first and second configuration, the at least one element of the first configuration consisting in a first idler gear and an accessory pinion, and the at least one element of the second configuration consisting in a second idler gear, and arranging an interaction between the input pinion, the mating gear, the multiple member gear and the at least one element according to the selected one of the first and second configuration, the interaction of the first configuration consisting in meshing the input pinion with the mating gear, meshing the multiple member gear with the first idler gear, meshing the first idler gear with the accessory pinion, and coupling the accessory pinion with the input pinion, the interaction of the second configuration consisting in meshing the input pinion with the second idler gear, meshing the second idler gear with the mating gear, and coupling the multiple member gear with the mating gear.

There is also provided, in accordance with the present invention, a kit for providing a single output shaft turboprop gearbox, the output shaft rotatable in either direction depending on a selected configuration of the gearbox, the kit comprising: the output shaft; an input shaft; a second stage gear set co-operative with output shaft; a first stage gear set having a first configuration and co-operative with the input shaft and with the second stage gear set, the first configuration being operable to permit rotation of the second gear stage in a first direction; and a first stage gear set having a second configuration and co-operative with input shaft and with the second stage gear set, the second configuration being operable to permit rotation of the second gear stage in a second direction opposite to the first direction; wherein only one of the first and second configurations is selected depending on the direction of rotation desired for the gas turbine engine.

There is further provided, in accordance with the present invention, a method of providing a single-propeller turboprop engine, the method comprising: providing a gas turbine; and providing a reduction gearbox, the gearbox mounted to an output shaft of the gas turbine, the gearbox having an output propeller shaft and at least first and second gear stages coupled to one another, the first gear stage adjacent and coupled to the output shaft of the turbine, the second gear stage adjacent and coupled to the output propeller shaft, wherein the step of providing the reduction gearbox includes the steps of: selecting a first gear stage configuration from a group consisting of a first gear set adapted to permit clockwise propeller operation and a second gear set adapted to permit counter-clockwise propeller operation; providing a second gear stage configuration operable with both the first and second gear sets of the first gear stage; selecting a desired direction of rotation for the propeller; and selecting the corresponding first gear stage configuration.

In this application, the term "standard rotation" will be used to refer to a first direction of rotation (e.g. one of clockwise or counter-clockwise) and the term "opposite direction of rotation" will be used to refer to a second, or opposite, direction of rotation.

BRIEF DESCRIPTION OF THE DRAWINGS

Reference will now be made to the accompanying drawings, showing by way of illustration a preferred embodiment thereof and in which.

DETAILED DESCRIPTION OF THE PREFERRED EMBODIMENTS

Figure 1:
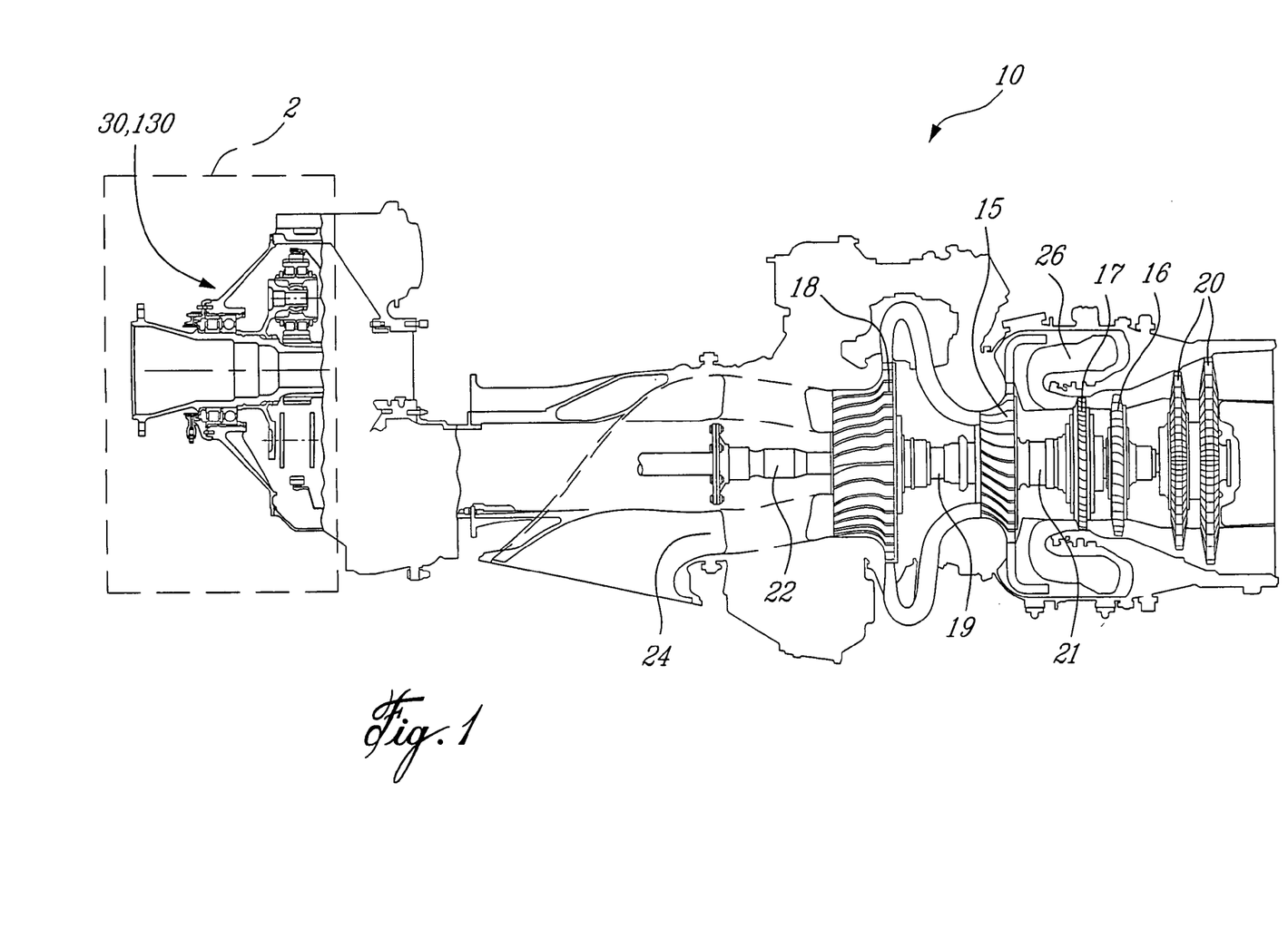
FIG. 1 is a side cross-section view of a gas turbine engine having an offset gearbox according to a preferred embodiment of the present invention.

FIG. 1 illustrates a turboprop engine 10 having an offset gearbox 30, 130 for driving a propeller. The engine 10 comprises a first rotating assembly including a low pressure (LP) turbine 16 and a LP compressor 18 mounted on an LP turbine shaft 19, and a second rotating assembly including a high pressure (HP) turbine 17 and a HP compressor 15 mounted on a HP turbine shaft 21. Power turbines 20 drive a power turbine output shaft 22, which provides rotational input into the gearbox 30, 130.

The LP and HP compressors 18, 15 draw air into the engine 10 via an annular air inlet passage 24, increasing its pressure and delivering the compressed air to a combustor 26 where it is mixed with fuel and ignited for generating a stream of hot combustion gases. The LP and HP turbines 16, 17 extract energy from the hot expanding gases for respectively driving the LP and HP compressors 18, 15. The hot gases leaving the LP and HP compressor turbines are accelerated again as they expand through the power turbines 20. The power turbines 20 provides rotational energy to drive the gearbox via the power turbine output shaft 22.

A gearbox 30, 130 reduces the speed of the power turbine 20 to one suitable for the propeller. In the present invention, the gearbox can either be a "standard rotation" gearbox 30 or an "opposite rotation" gearbox 130, depending on the desired direction of rotation for the propeller. The gearboxes 30, 130 of the present invention advantageously may both be provided from substantially the same components, as will be explained further below.

Figure 2:
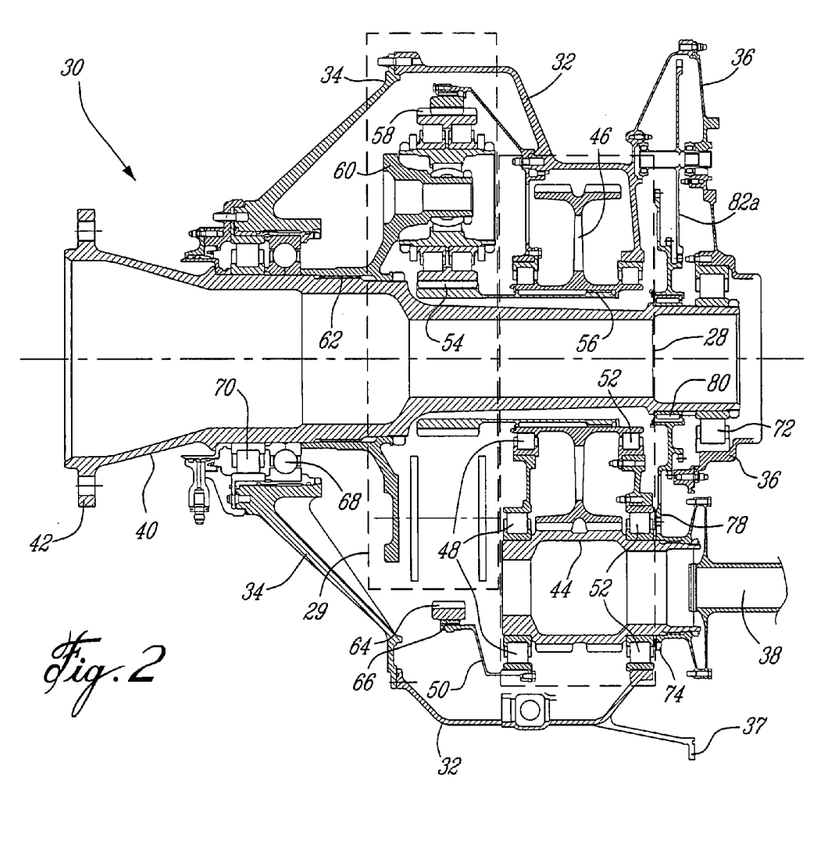
FIG. 2 is a side cross-section view of a "standard rotation" offset gearbox, according to a preferred embodiment of the present invention.

Referring to FIG. 2, the "standard rotation" gearbox 30 is shown in more details. A gearbox housing 32, front cover 34 and accessory drive cover 36 forms a casing containing the various gearbox components. A flange 37 on the gearbox housing 32 provides the turbomachinery/gearbox interface. A flexible input drive shaft 38 couples the gearbox 30 to the turbine shaft 22. An output shaft 40 includes a flange 42 to which the propeller is attached. The output shaft is supported by a front ball bearing 68 and a roller bearing 70 which are mounted in the front cover 34 and by a rear rolled bearing 72 which is mounted in the accessory drive cover 36.

The gearbox 30 is preferably a two stage reduction gearbox with an offset first stage 28 and a planetary second stage 29, indicated for description purposes by dotted lines in the Figures.

Figure 3:
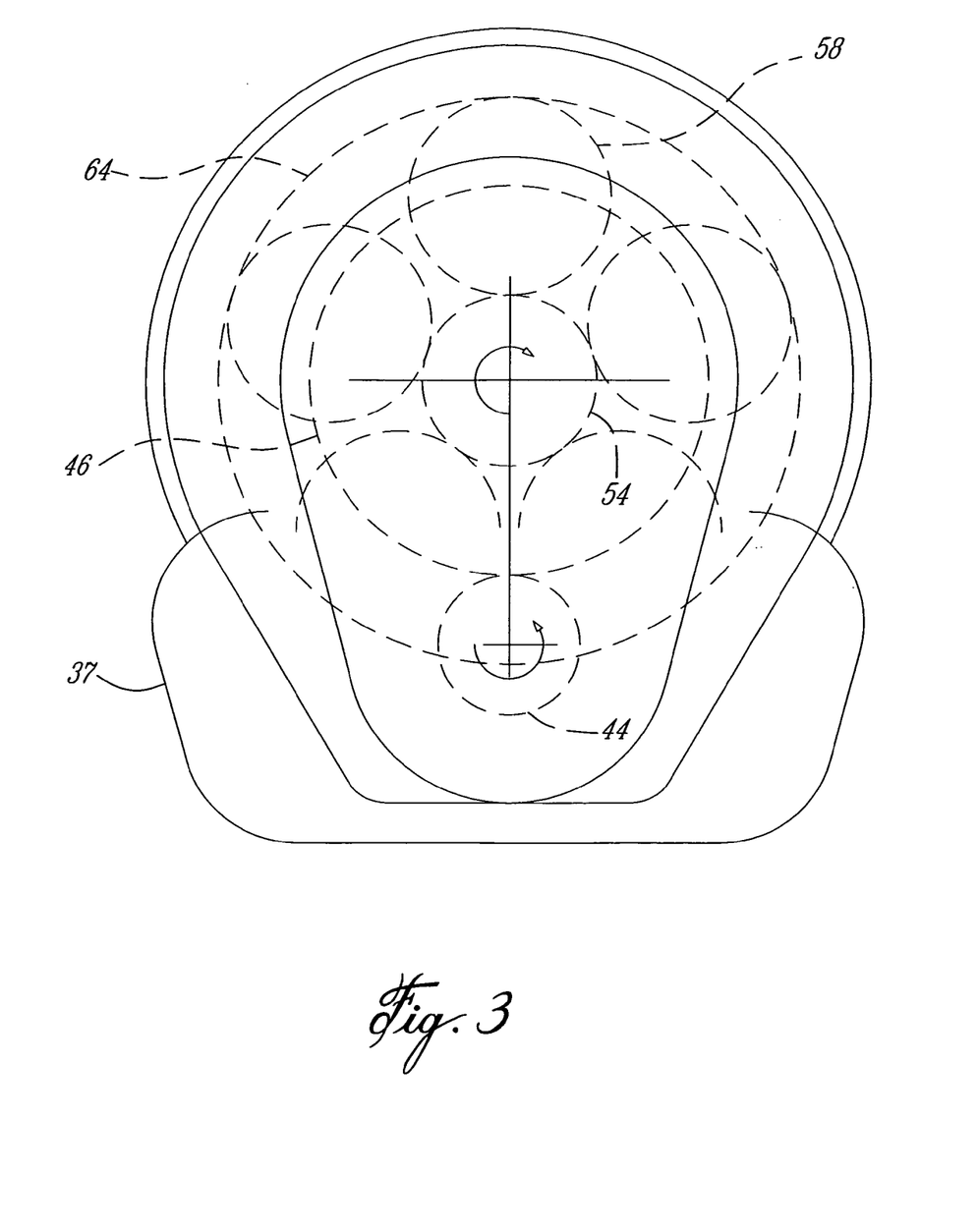
FIG. 3 is a partial schematic aft view of the gearbox of FIG. 2 showing main drive gears thereof.

Referring to FIGS. 2–3, the first stage consists of an input pinion 44 coupled to the drive shaft 38 and meshing with a first stage gear, or mating gear, 46 which is coaxial with the output shaft 40. The first stage gears 44 and 46 are double helical gears. The first stage 28 is supported by front bearings 48 which are attached to a support housing 50 mounted into the gearbox housing 32, and by rear bearings 52 which are attached to the gearbox housing 32.

The second stage 29 is epicyclic and preferably composed according to the following description. A sun gear 54, coaxial with the output shaft 40 and coupled to the first stage gear 46 by a free spline 56, is meshed with a plurality of planet gears 58. The planet gears 58 are supported on a planet carrier 60, which they drive. The planet carrier 60 is coupled to the output shaft 40 by a fixed spline coupling 62. A stationary ring gear 64 is meshed with the planet gears 58 such as to allow an orbiting motion thereof. The stationary ring gear 64 is coupled to the support housing 50 by a free spline coupling 66. The second stage is preferably made in accordance with U.S. application Ser. No. 10/628,573, filed Jul. 29, 2003 by the applicant, which is incorporated herein by reference.

Figure 4:
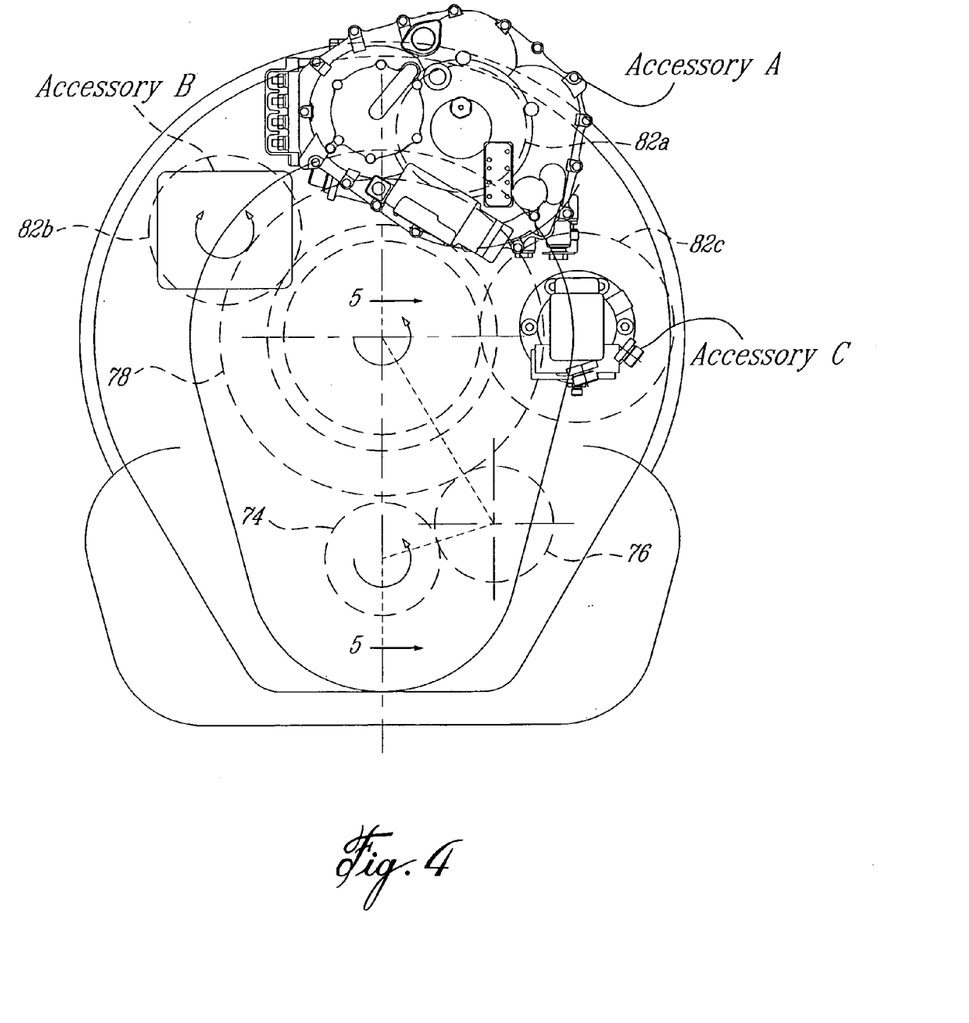
FIG. 4 is a partial schematic aft view of the gearbox of FIG. 2 showing an accessory drive.
Figure 5:
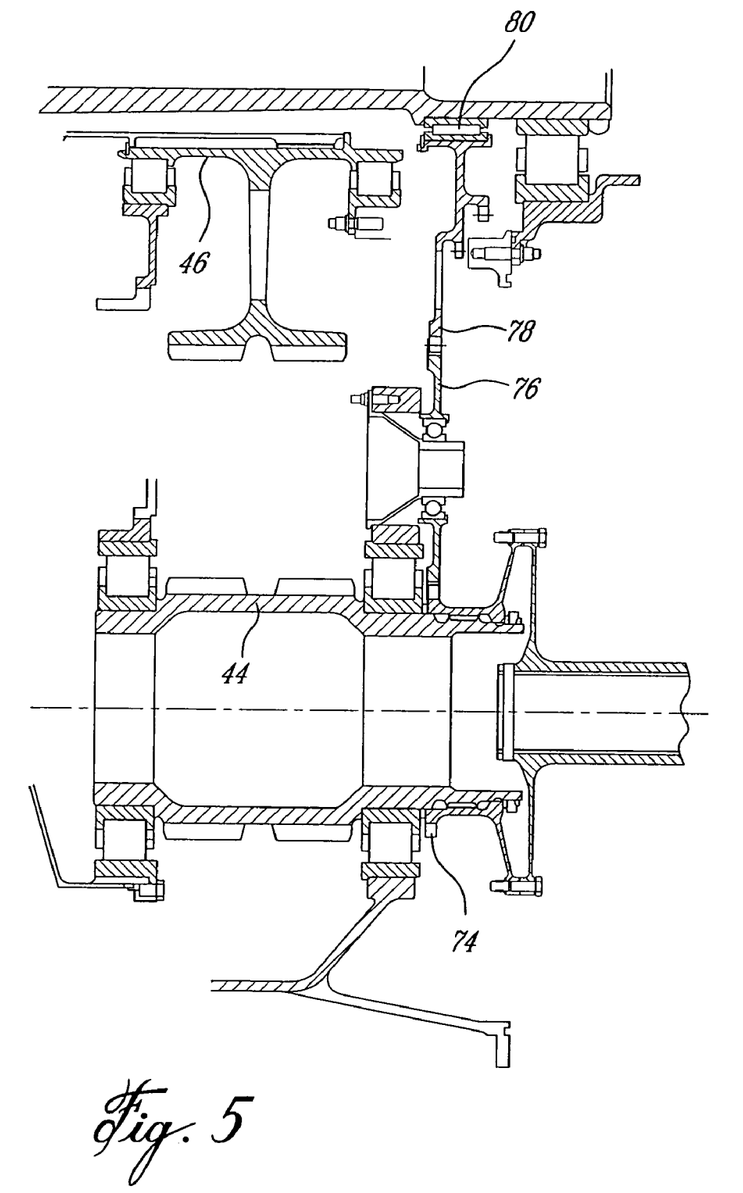
FIG. 5 is a sectional view of the accessory drive of FIG. 4 taken along line 5—5.

The gearbox 30 includes three accessory drives, each preferably rotating at different speeds in the clockwise direction looking from the rear of the engine. Referring to FIGS. 2, 4 and 5, an accessory pinion 74 is coupled to the pinion 44. The accessory pinion 74 is meshed with an idler gear 76 which is in turn meshed with a triple accessory gear 78. The triple accessory gear 78 is an idler mounted onto the output shaft 40 by, for example, a needle roller bearing 76 and is thus free to rotate about its axis. Three accessory drive gears 82a, b, c mesh with the corresponding member of the triple accessory gear 78 such as to each drive an accessory.

The first stage gears of both gearboxes 30, 133 are typically more suitable for driving the engine accessories than the second stage gears. The selection of the input drive to the accessories is thus reduced to the choice of either the pinion 44 or the gear 46. Although driving the accessories from the gear 46 is possible, such design cannot be easily adapted for use in a gearbox 130 designed for opposite direction rotation. The configuration of the present invention, in selecting pinion 44 as the driver, presents a design which, although in appearance seems more complex, will actually allow for a great deal or commonality between the two gearboxes 30, 130, as will be explained further below.

Figure 6:
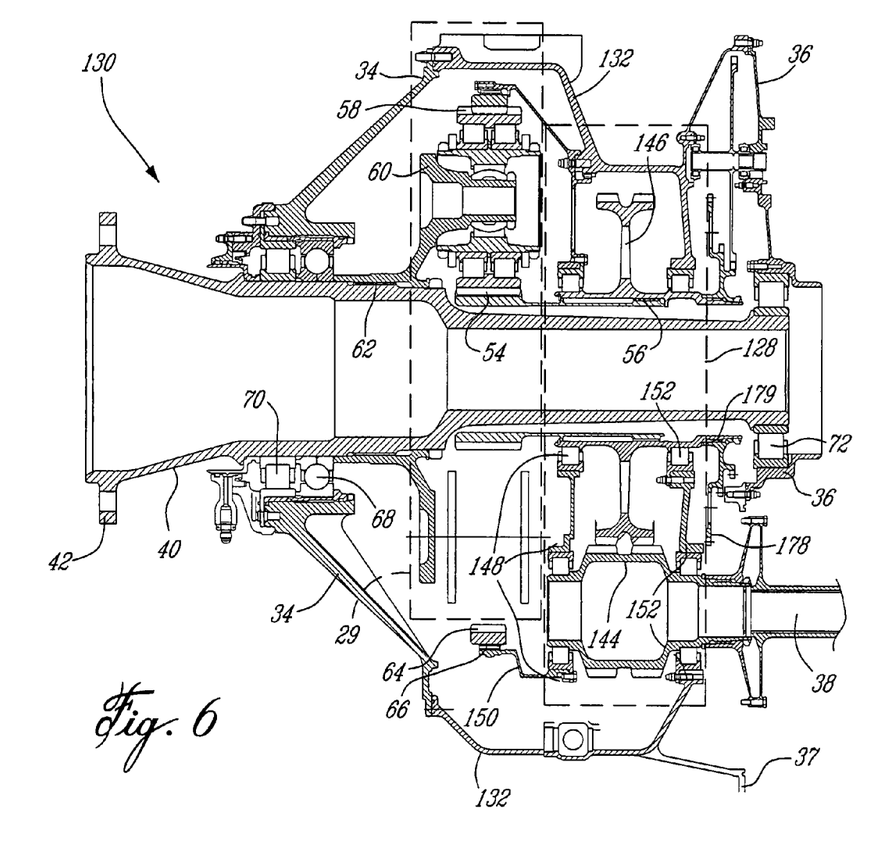
FIG. 6 is a side cross-section view of a gearbox similar to FIG. 2 but configured according to a preferred embodiment of the present invention for rotation in the opposite direction.

Referring to FIG. 6, the opposite rotation gearbox 130 is shown in more details. All the components with identical reference numerals are preferably identical to the corresponding components in the standard rotation gearbox 30, while corresponding components having slight differences are identified by similar reference numerals to FIGS. 1–5, but incremented by 100. As with the standard rotation gearbox 30, the opposite rotation gearbox 130 includes a gearbox housing 132, a front cover 34, an accessory drive cover 36, a flange 37, a flexible input drive shaft 38 to couple the gearbox 130 to the turbine shaft 22, and an output shaft 40 with shaft flanges 42 to receive the propeller. Like in the standard rotation gearbox 30, the output shaft is supported by the front ball bearing 68 and the roller bearing 70 and by the rear roller bearing 72. Slight differences exist between the gearbox housings 32, 132, which will be detailed further below.

Figure 7:
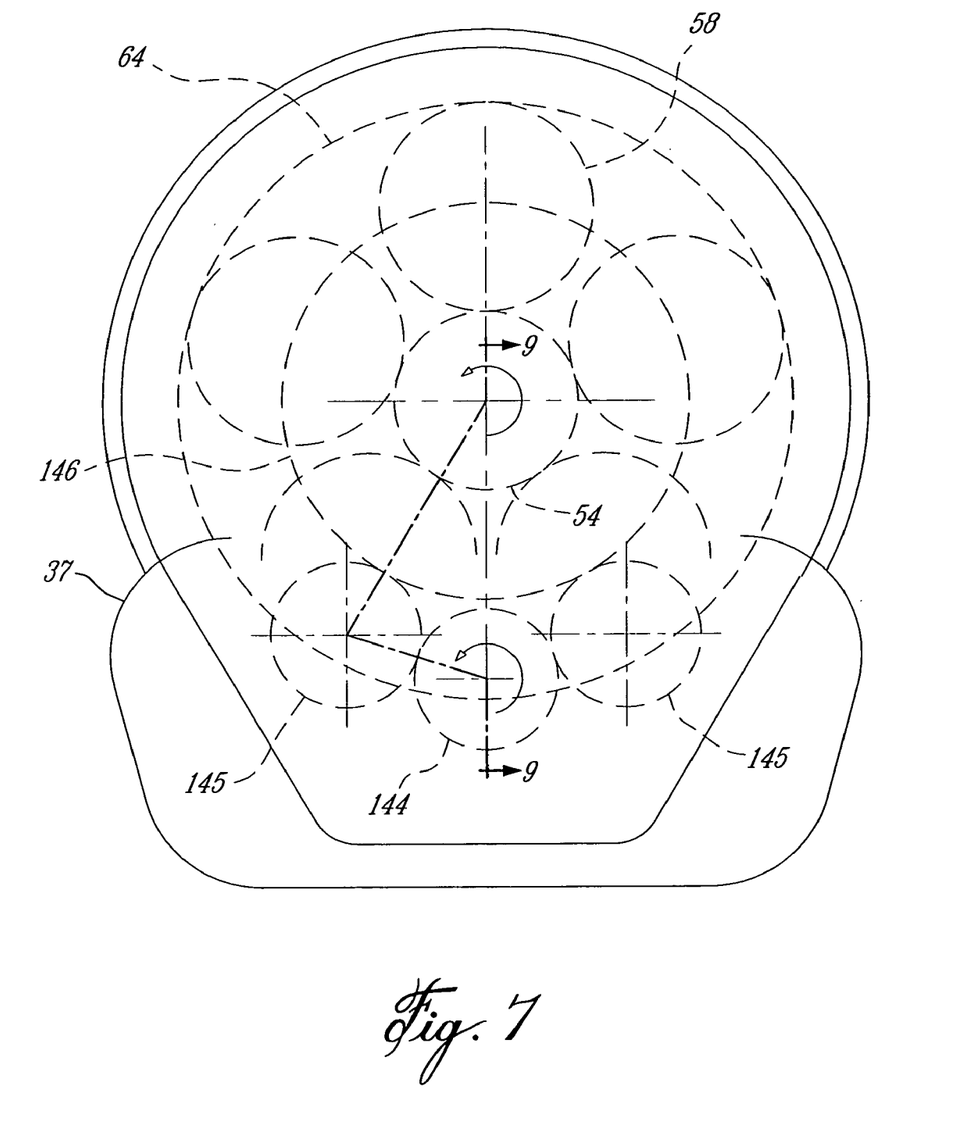
FIG. 7 is a partial schematic aft view of the gearbox of FIG. 6 showing main drive gears thereof.

The gearbox 130 is also preferably a two stage reduction gearbox with an offset first stage 128. Referring to FIGS. 6–7, the first stage 128 is composed of an input pinion 144 coupled to the drive shaft 38 and meshing with two idler gears 145. The two idler gears 145 are then meshed with a first stage gear, or mating gear, 146 which is coaxial with the output shaft 40. The gears 144, 145 and 146 are also double helical gears. The first stage 128 is supported by front bearings 148 which are attached to a support housing 150 mounted into the gearbox housing 132, and by rear bearings 152 which are attached to the gearbox housing 132.

The second stage 29 of the opposite rotation gearbox 130 is identical to the second stage 29 of the standard rotation gearbox 30 and therefore need not be described again here.

The pinion 144 and gear 146 are smaller than, respectively, the pinion 44 and the gear 46 of the standard rotation gearbox 30. However, the rotational speed and the centre distance between the input and output drives is preferably the same between the two gearboxes 30, 130. Because the power from the input shaft 33 is split between two gears (idler gears 145), lower bearings loads are transmitted on the bearings 148, 152, which are thus smaller than the bearings 48, 52 of the standard rotation gearbox 30. Because of the different configuration of the first stage, the gearbox housings 32, 132 and support housings 50, 150 are slightly different at the location supporting the pinion 44, 144 and bearings 48, 52 and 148, 152. However, these differences are minor and both sets of housings can be machined from an identical casting, which is preferred. All other components of the first stage 128 are preferably identical to corresponding components of the standard rotation gearbox 30. Smaller bearings and smaller gears somewhat compensate for the addition of the idler gears, and the weight difference between the two gearboxes 30, 130 is minimal.

Figure 8:
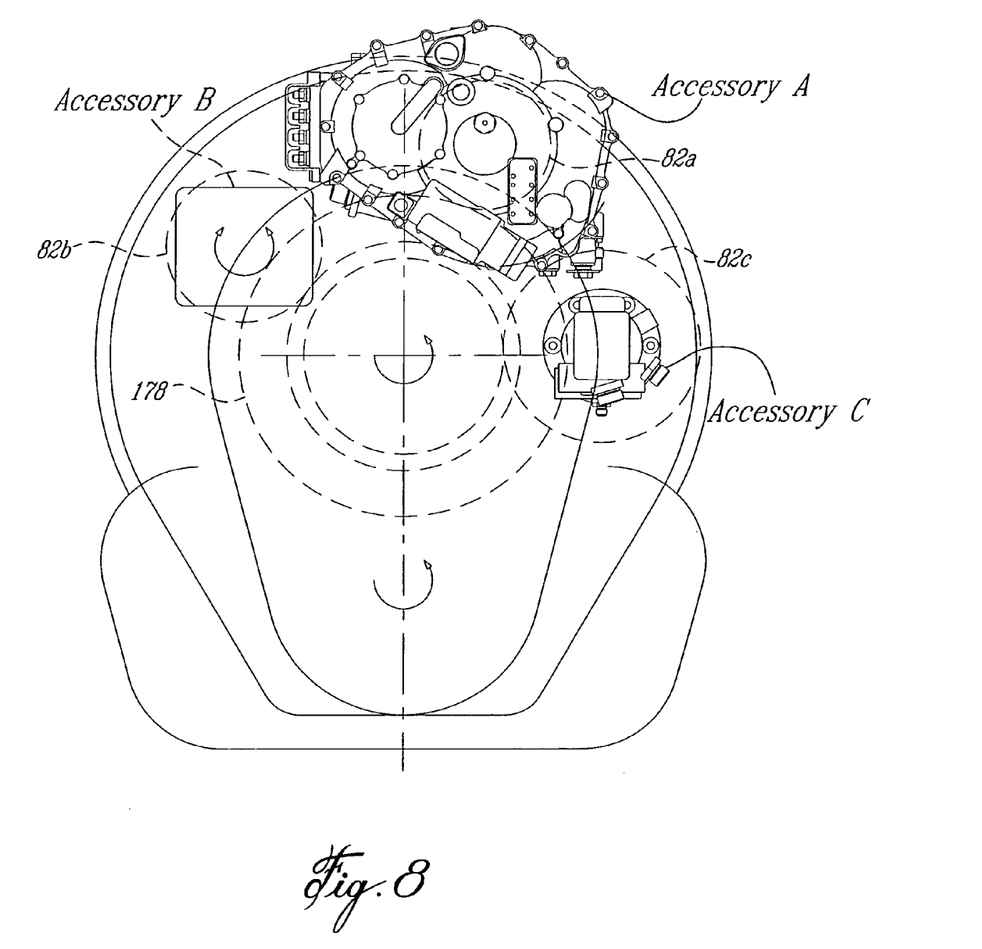
FIG. 8 is a partial schematic aft view of the gearbox of FIG. 6 showing an accessory drive.
Figure 9:
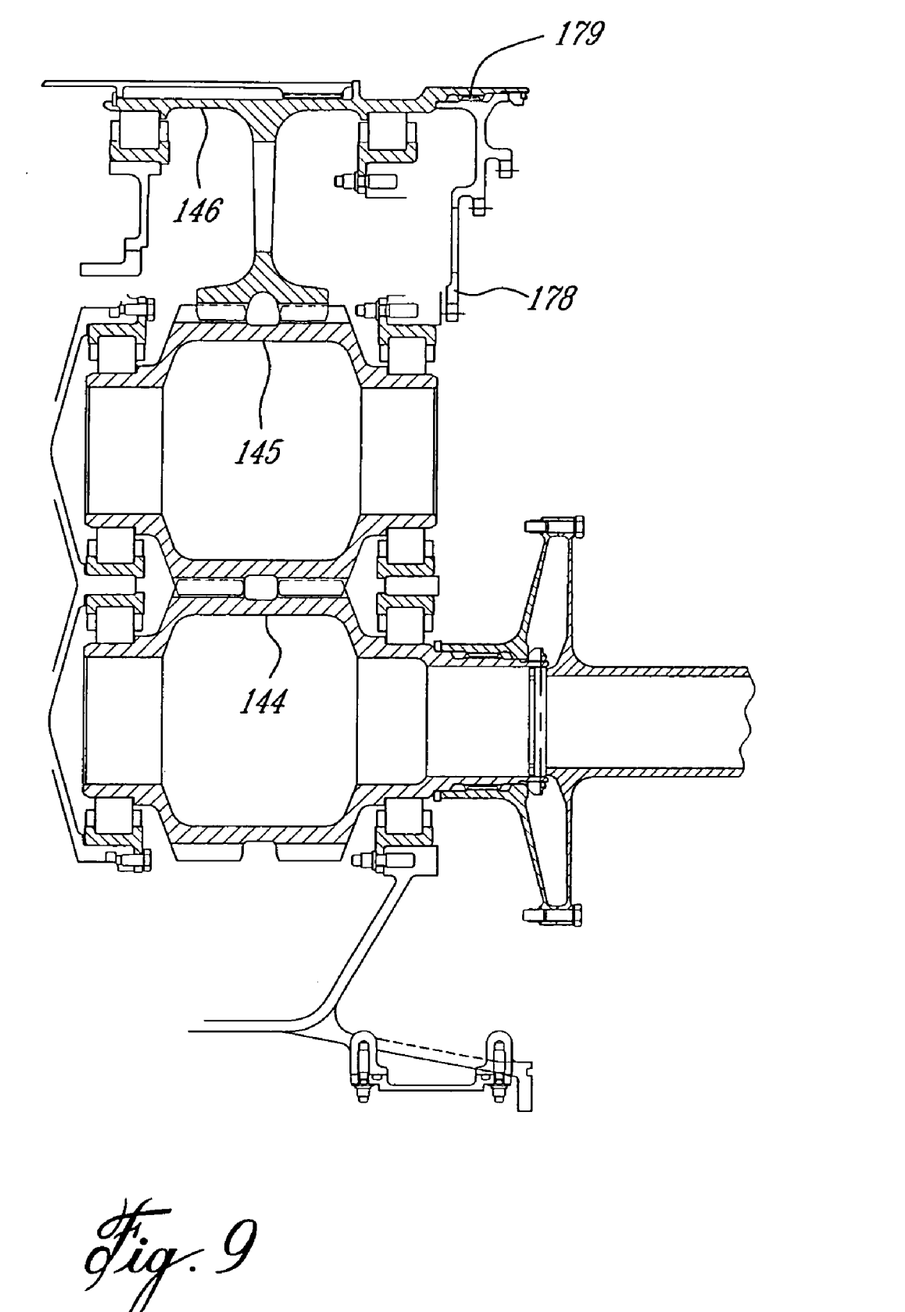
FIG. 9 is a sectional view of the main drive gears of FIG. 7 taken along line 9—9.

As with the standard rotation gearbox 30, the opposite rotation gearbox 130 has three accessory drives, each preferably rotating at different speeds in the clockwise direction looking from the rear of the engine. Referring to FIGS. 6, 8 and 9, a triple accessory gear 178 is directly coupled to the first stage gear 146 by a fixed spline 179. The triple accessory gear 178 thus differs from the triple accessory gear 78 of the standard rotation gearbox 30 which was free to rotate about its axis. However, the gear teeth members of the gears 78, 178 are preferably identical: the only difference here is in the hub of the gear. Three drive gears 82a, 82b and 82c, identical to the drive gears of the standard rotation gearbox 30, mesh with the corresponding member of the triple accessory gear 178 such as to each drive an accessory.

The accessory drive of the opposite rotation gearbox 130 thus differs from that of the standard rotation gearbox 30 in that the accessory pinion 74 and idler gear 76 are not present, and that the hub of the triple accessory gear 178 is adapted for receiving a spline instead of a bearing. However, the location, size and rotational speed of the triple accessory gears 78, 178 and accessory drive gears 82a, 82b, and 82c is the same for both gearboxes 30, 130.

There is no need for an idler for the right rotational direction, in case of the gearbox 130, but driving accessories directly from the first stage gear 146 would make accessory gears excessively large (transmission ratios range between 1 and 2.5) and is therefore not preferred. Selection of the pinion 144 or the idler gear 145 for the same purpose also offers few benefits compared to the scheme of the present invention. In the present invention, the triple accessory gear 78, 178 is driven by the pinion 44 in the case of the standard rotation gearbox 30, and by the first stage gear 146 in the case of the opposite rotation gearbox 130. However, in both cases the triple accessory gear 78, 178 is preferably at the same location and is driven in the same direction and speed. The accessory drive gears 82a, 82b and 82c in both gearboxes 30, 130 can thus be identical and at the same location. This allows for the configuration of the accessory drive elements of the two gearboxes 30, 130 to be the same, and for the accessory drive covers 36 and portions of the gearbox housings 32, 132 supporting the accessory drives to be identical.

The two gearboxes 30, 130 can thus be provided with components having a high degree of commonality, with the exceptions being the first stage gears and the input components of the accessory drive. The support and gearbox housings may also be slightly different, but the similarity is sufficiently close that both housings can be machined from the same casting, which represents savings in fabrication. The present design thus allows for the construction of either a standard rotation gearbox or an opposite rotation gearbox with few unique components, thus reducing the costs of manufacturing and inventory.

The embodiments of the invention described above are intended to be exemplary. Those skilled in the art will therefore appreciate that the foregoing description is illustrative only, and that various alternatives and modifications can be devised without departing from the spirit of the present invention. For example, the specific design of the first and second stages may be altered without departing from the scope of the teachings contained herein. Casing and accessory design may also be modified. Still other changes will be apparent to the skilled reader. Accordingly, the present invention, as defined by the appended claims, is intended to embrace all such alternatives, modifications and variances.

The invention claimed is:

1. A gearbox for rotating a propeller of a gas turbine engine in a selected one of a first and second direction, the gearbox comprising:
   a casing defining an enclosure;
   an output shaft rotating the propeller in the selected one of the first and second directions, the output shaft being partially enclosed in the casing;
   a mating gear driving the output shaft through a gear train, the mating gear having a first position within the casing;
   an input shaft receiving power from a turbine and rotating in the first direction, the input shalt being partially enclosed in the casing;
   an input pinion coupled to the input shaft, the input pinion having a second position within the casing;
   a plurality of accessory drive gears each adapted to drive one accessory, the plurality of accessory drive gears each having a third position within the casing;
   a multiple member gear rotating in the first direction, each member of the multiple member gear being meshed with at least one of the plurality of accessory drive gears, and the multiple member gear having a fourth position within the casing;

wherein an interaction exists between the input pinion, mating gear and multiple member gear, selected from the group consisting of a first and second configuration with the first, second, third and fourth positions being the same in the first and second configuration, the first configuration consisting of the input pinion being meshed with the mating gear such that the mating gear rotates in the second direction, and the multiple member gear being meshed with a first idler gear which is meshed with an accessory pinion coupled to the input pinion, the first idler gear and the accessory pinion being located within the casing, and the second configuration consisting of the input pinion being meshed with a second idler gear which is meshed with the mating gear such that the mating gear rotates in the first direction, the second idler gear being located within the casing, and the multiple member gear being coupled to the mating gear; and wherein the selection between the first and second configurations determines the selected one of the first and second directions.

2. The gearbox according to claim 1, wherein the casing is composed of a plurality of detachably connected housings.

3. The gearbox according to claim 1, wherein the mating gear is coaxial with the output shalt.

4. The gearbox according to claim 3, wherein the gear train is composed of a sun gear coaxial with the output shaft and meshed with a plurality of planet gears, a planet carrier rotationally supporting the plurality of planet gears, and a stationary ring gear meshed with the plurality of planet gears, the planet carrier being coupled to the output shaft and the mating gear being coupled to the sun gear.

5. The gearbox according to claim 3, wherein the multiple member gear is coaxial with the output shaft.

6. The gearbox according to claim 1, wherein the plurality of accessory drive gears are identical.

7. The gearbox according to claim 1, wherein one accessory drive gear is meshed with each member of the multiple member gear.

8. The gearbox according to claim 1, wherein the multiple member gear has three members.

9. A kit for providing a single output shaft turboprop gearbox, the output shaft being rotatable in selected single one of two opposite directions, the kit comprising:

the output shaft;

an input shaft;

a second-stage gear set co-operative with the output shaft;

a first first-stage gear set having a first configuration and co-operative with the input shaft and with the second-stage gear set, the first configuration being operable to permit rotation of the output shaft in a first one of the opposite directions through the second-stage gear set; and a second first-stage gear set having a second configuration and co-operative with the input shaft and with the second-stage gear set, the second configuration being operable to permit rotation of the output shaft in a second one of the opposite directions through the second-stage gear set;

wherein only one of the first and second first-stage gear sets is selected and installed in a gearbox casing in engagement with the input shaft and the second-stage gear set depending on the selected single one of the opposite directions.

10. The kit according to claim 9, wherein at least one of the first and second first-stage gear sets is an offset reduction stage.

11. The kit according to claim 9, wherein the second-stage gear set is an epicyclic reduction stage.

12. The kit according to claim 9, further comprising at least one accessory drive gear driven by the selected one of the first and second first-stage gear sets.

13. The kit according to claim 9, further comprising the gearbox casing, the casing being configured to receive the second-stage gear set and the selected one of the first and second first-stage gear sets.

14. The kit according to claim 9, wherein one of the first and second first-stage gear sets includes at least one idler gear operable to reverse a direction of rotation of a driven gear in the one of the first-stage gear sets relative to a direction of rotation of a corresponding driven gear of the other of said first-stage gear sets.

* * * * *

UNITED STATES PATENT AND TRADEMARK OFFICE
CERTIFICATE OF CORRECTION

| | |
|---|---|
| PATENT NO. | : 7,144,349 B2 |
| APPLICATION NO. | : 10/817857 |
| DATED | : December 5, 2006 |
| INVENTOR(S) | : Lazar Mitrovic |

It is certified that error appears in the above-identified patent and that said Letters Patent is hereby corrected as shown below:

In the claims:

claim 1, column 6, line 59, delete "shalt" and insert --shaft-- claim 3, column 7, line 29, delete "shalt" and insert --shaft--

Signed and Sealed this

Twenty-seventh Day of February, 2007

JON W. DUDAS
*Director of the United States Patent and Trademark Office*